United States Patent
Kuder et al.

Patent Number: 5,121,376
Date of Patent: Jun. 9, 1992

[54] OPTICAL DISK MEMORY USING MULTI-LEVEL DATA RECORDING

[75] Inventors: James E. Kuder, Fanwood; Harris A. Goldberg, Colonia, both of N.J.

[73] Assignee: Hoechst Celanese Corp., Somerville, N.J.

[21] Appl. No.: 461,138

[22] Filed: Jan. 4, 1990

[51] Int. Cl.$^5$ ............................................. G11B 7/00
[52] U.S. Cl. .................................. 369/100; 369/286; 365/106
[58] Field of Search ............... 369/110, 284, 286, 100, 369/103; 346/135.1; 365/106, 119; 355/32

[56] References Cited

U.S. PATENT DOCUMENTS

| | | | |
|---|---|---|---|
| 3,651,488 | 3/1972 | Amodel | 365/125 X |
| 4,845,529 | 7/1989 | Pearson et al. | 365/215 X |

Primary Examiner—Robert L. Richardson
Attorney, Agent, or Firm—P. S. Kalyanaraman

[57] ABSTRACT

An apparatus and a process for storing and retrieving information comprising an optical disk having a substrate and a recording layer of a predetermined optical thickness disposed on the substrate. The indices of refraction of the substrate and recording layer are unequal, causing Fresnel reflections from the surface of the layer and the boundary between the substrate and the layer. The optical thickness of the layer is selectively changeable to a plurality of distinct values different from the predetermined value, thereby changing the intensity reflectance of the optical disk to one of a plurality of values. Differences in the intensity of light reflected or transmitted by the disk are detected and serve to represent information according to a multi-level rather than binary digital system.

9 Claims, 3 Drawing Sheets

OPTICAL DISK MEMORY USING MULTI-LEVEL DATA RECORDING

BACKGROUND

The present invention relates to storage and retrieval of digital information on optical disk media using multi-level rather than binary data coding.

The technology of digital data storage using optical memory devices has advanced rapidly since its inception. Commercial uses at present range from compact disks (CDs) which provide remarkably high-quality audio reproduction to computer memories which provide extremely large yet compact data storage capacity. As applied to the requirements of computer mass storage, optical disks have been categorized according to the ease with which digital data can be written onto them. Optical read-only memories (OROMs) such as compact disk ROMs (CD-ROMs) have data written onto them before they leave the factory; write-once read-many (WORM) disks allow the user to write data onto them once and read that data indefinitely; erasable optical disks permit the user to write and read data with the same flexibility as magnetic storage media such as floppy and hard disks.

One of the reasons that optical storage media have increased in popularity is the very large capacity they provide in a small volume. For example, a single 12-cm diameter CD-ROM stores about 550 megabytes of data while 36-cm diameter media may soon store 10 gigabytes on a single disk side. Even with such large capacity, some applications still strain the capability of optical media; it has been anticipated that 400 megabytes will be necessary to store the data from only a single day's operation of a modern space problem. Besides coping with these massive-capacity applications, optical disks which can store data at a higher density can be smaller, lighter and cheaper than other memory devices.

Most optical disk systems employ apparatus such as that shown in FIG. 1. The optical disk 1 which generally comprises a transparent substrate 3 and a thin recording film 5 deposited on the substrate is often illuminated from below by light from a laser. There is sometimes a reflective layer (not shown) of a metal such as aluminum deposited on the recording film 5. The linearly polarized light from the laser is collimated and shaped by beam-forming optics 12 and directed to the disk by a beam-splitter 14. The beam-splitter 14 is of the polarizing type and may be arranged as shown in the figure to reflect light polarized in the direction of the laser. A quarter-wave plate 16 converts the linearly polarized light into circularly polarized light which is focused by an objective lens 18 to a very small spot on the disk 1. The objective lens is axially and transversally movable to maintain proper focusing and positioning of the light on the disk. Because the size of the focused spot is of the order of one micrometer in diameter, each disk can store a very large quantity of information.

Some of the light focused on the disk is reflected. This light is collected by the objective lens 18 which directs it back through the quarter-wave plate 16. Since the light reflected is circularly polarized, the plate 16 converts that light to the linear polarization which is perpendicular to that emitted by the laser 10. Light of that polarization is transmitted by the beam-splitter 14 and thus the laser 10 is isolated from the reflected light. The light reflected from the disk 1 which is transmitted by the beam-splitter 14 is finally focused by another lens 20 divided by another beam-splitter 22, and detected by two sets of detectors 24 and 26. The first set of detectors 24 is used to detect the information stored on the disk and to derive signals for correcting the axial position of the objective lens 18. The second set of detectors 26 is used to derive signals for correcting the transverse position of the objective lens.

It should be understood that the apparatus shown in FIG. 1 is only illustrative of a conventional optical disk memory system. The necessary data and position signals can be derived from only a single set of detectors, rendering the beam-splitter 22 unnecessary. Also, the polarizing beam-splitter 14 may be arranged to transmit the light emitted from the laser 10 and reflect the light reflected by the disk 1.

Information is usually stored on the disk in the form of pits in the recording film 5. As illustrated in FIG. 2, the pits 7 can consist of holes, which are arranged in tracks 9, in the recording layer 5. The holes are usually formed by an intense laser beam focused onto the layer which is formed of a material which absorbs the laser light and ablates or melts as a result of heating caused by the energy absorbed. The intensity of the light reflected from the disk is modulated by the presence or absence of the pits. The layer 5 may be composed of tellurium alloys, bubble-forming materials, multilayer optical cavities, colloids, microtextured absorbers or organic dyes. The pits are written by a relatively high power laser beam, for example 10–30 mW, while they are read by a low power beam, typically 0.5 mW. Both reading and writing can be performed by a single semiconductor laser, such as those of gallium arsenide, emitting at wavelengths in the near-infrared spectrum between about 0.7 micrometers and 1.6 micrometers.

The intensity of the light reflected from the disk is modulated by the pits in at least two ways. As described in U.S. Pat. Nos. 4,161,752 and 4,475,183, light reflected from the pits 7 interferes with light reflected from the disk surface adjacent to the pits. The disk surface adjacent the pits is either another data track having a different depth of pit read by a second laser of appropriate wavelength or an unmodified region of the disk. Since the phase of the light reflected from the bottom of the pit is different from the phase by the light reflected from the adjacent surface because the pit-reflected light travels farther before being reflected, interference occurs. The phase difference between the reflected light bemas is adjusted to cause destructive interference, resulting in the presence of a pit being detected as a reduction in reflected intensity.

Another way that the reflected intensity can be modulated by the pits arises from the scattering of light caused by the pits. Light is reflected from the unmodified flat disk surface in a substantially constant direction toward the objective lens 18. On the other hand, light is reflected from the pits in a multiplicity of directions, so the amount of light collected by the objective lens is always less when a pit is illuminated. Again, the presence of a pit is detected as a reduction in reflected intensity.

According to these methods, the intensity of reflected light takes on either one of two main values which are arbitrarily assigned to represent the ONE and ZERO of a binary digital encoding system. Since one of the major advantages of optical storage media is their high data storage capacity, using only a binary system limits that capacity. The system disclosed in U.S Pat. No.

4,161,752 is directed to increasing the disk capacity by placing the data tracks closer together However, to avoid cross-talk between the adjacent tracks, the system disclosed includes two read lasers of differing wavelength. This increase in complexity and cost could be avoided by an optical disk in which data is encoded by a multi-level digital system.

SUMMARY

Accordingly, it is an object of the present invention to provide an optical disk which stores digital data encoded by a multi-level system.

It is a further object of the present invention to provide an optical disk with larger storage capacity than currently available disks.

These and other objects and advantages are achieved by an optical disk comprising a transparent substrate and a recording layer having a predetermined thickness deposited on the substrate. The recording layer has a refractive index at a predetermined wavelength which is different from the refractive index of the substrate at the same wavelength. The thickness of the recording layer is changeable to a plurality of values different from the predetermined thickness. The intensity of substantially monochromatic light reflected from the disk or transmitted by the disk may thereby take on a plurality of distinct values, allowing data encoding by a digital system.

In one embodiment of the present invention, the recording layer is an organic material which has a thickness changeable to one of two separate values different from the predetermined thickness.

BRIEF DESCRIPTION OF THE DRAWINGS

The foregoing and other objects and advantages will become apparent from the following detailed description read in conjunction with the drawings in which.

DETAILED DESCRIPTION OF THE PREFERRED EMBODIMENTS

Figure 1:
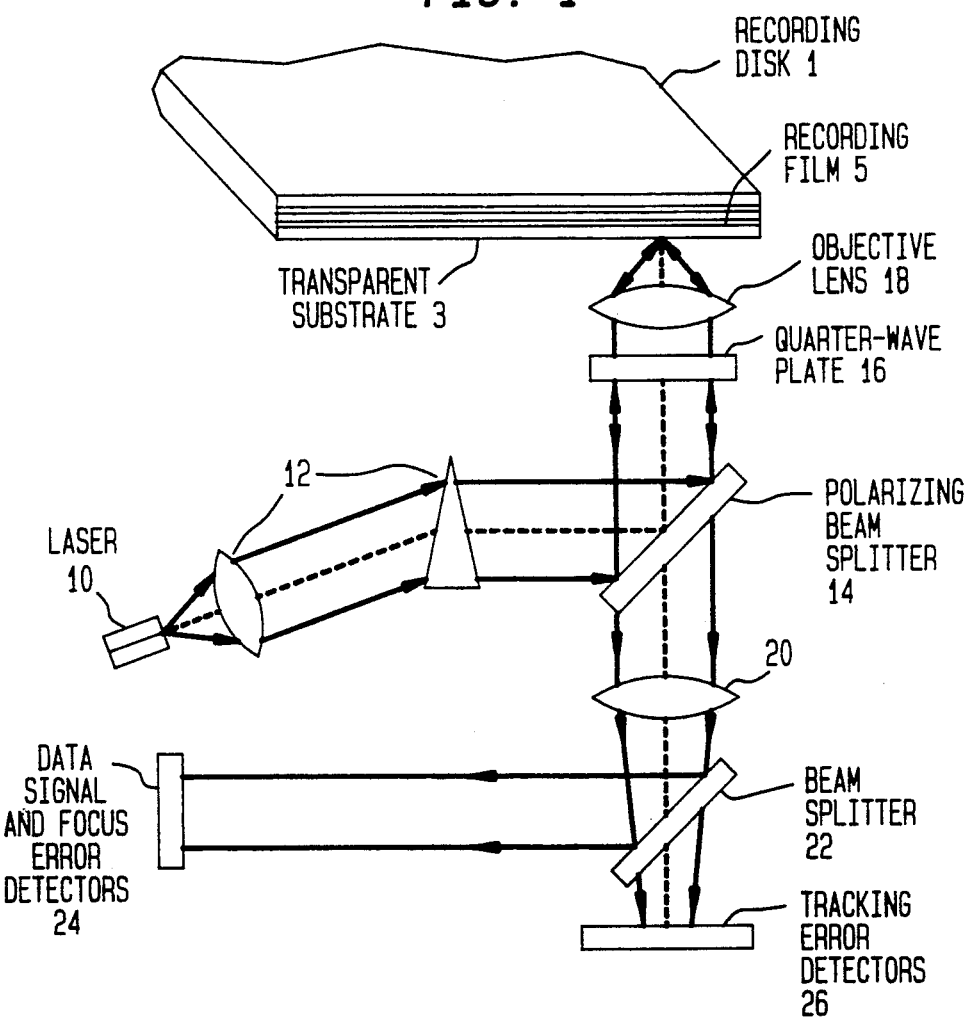
FIG. 1 is a diagram of a typical system for reading an optical disk.
Figure 2:
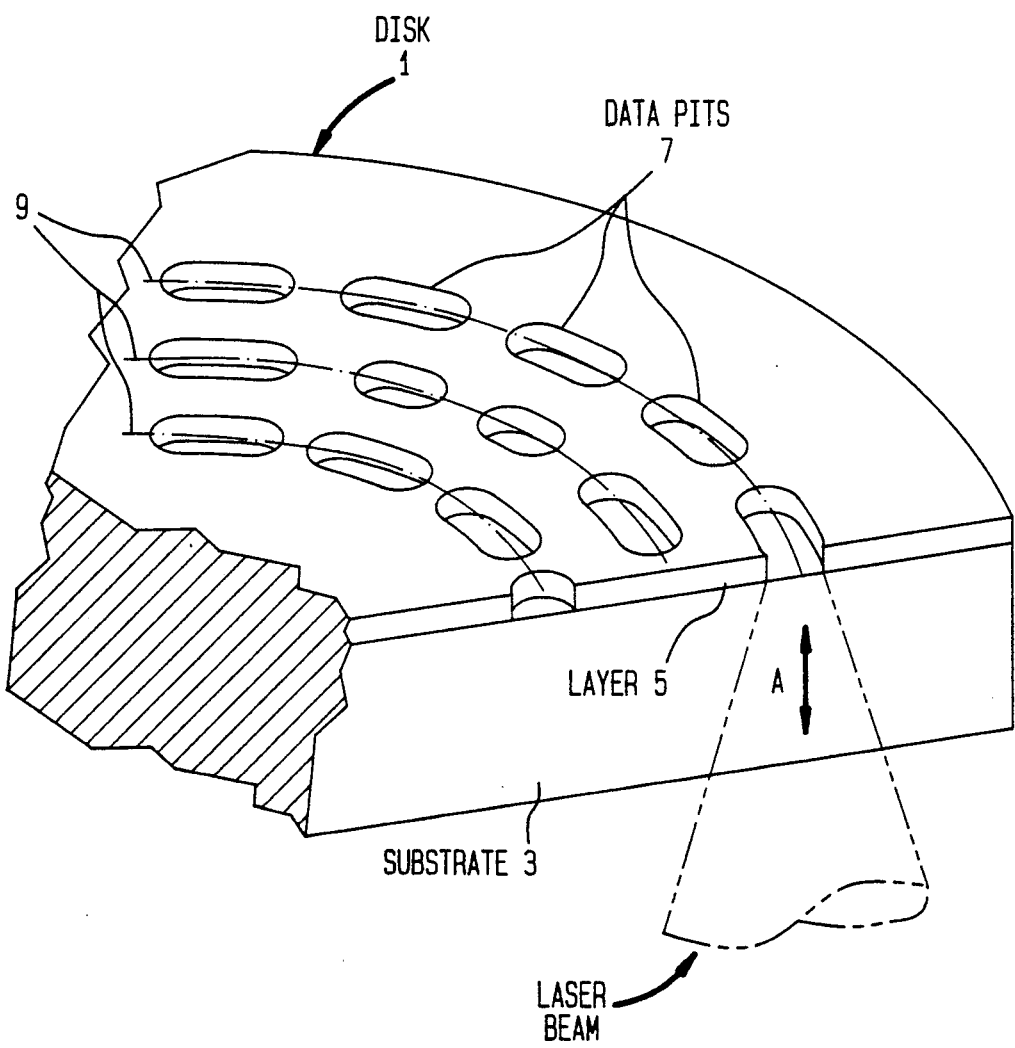
FIG. 2 shows a section of a typical optical disk.
Figure 3:
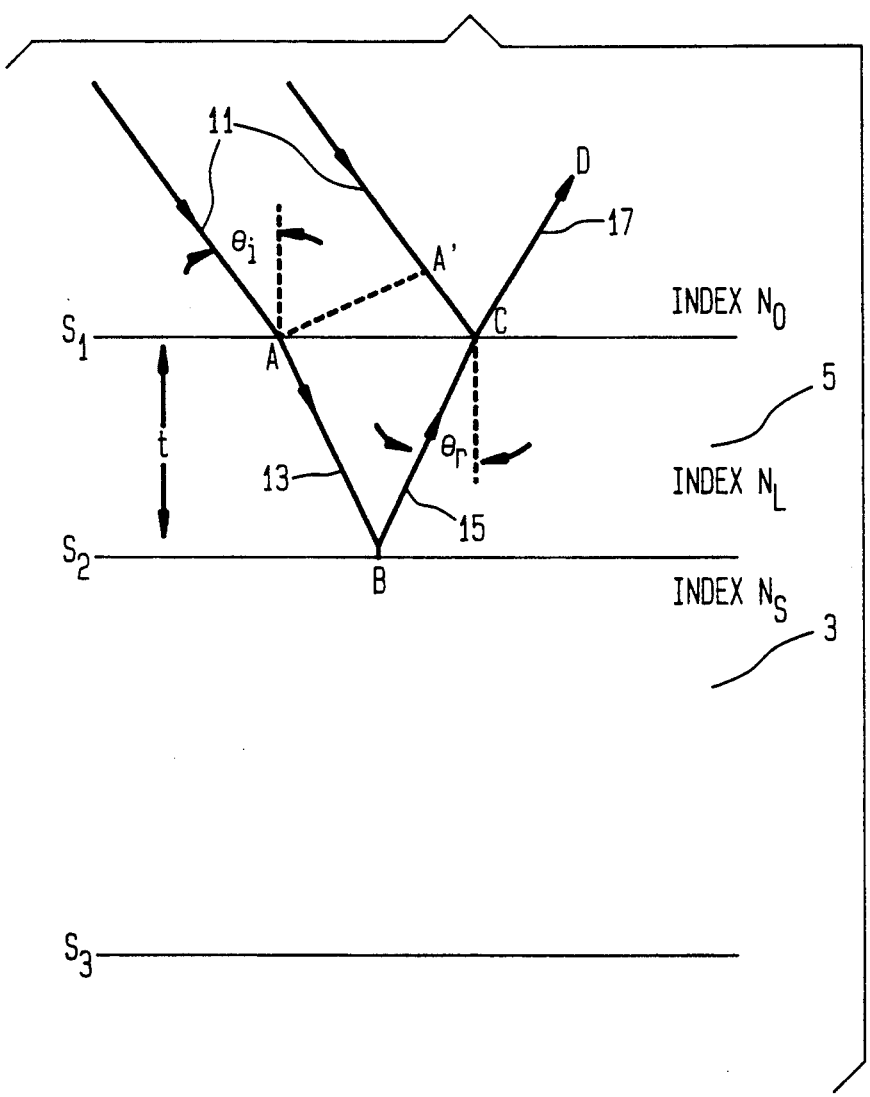
FIG. 3 is a diagram of light paths in the recording layer of an optical disk.

FIG. 3 shows a portion of a cross-section of an optical disk. For clarity, the thickness of the recording layer 5 is shown exaggerated with respect to the thickness of the substrate 3, and incident light rays 11 are shown inclined to the perpendicular to the layer and substrate. In a typical optical disk memory system the light is incident perpendicular to the surface of the disk. Also, the light rays 11 are shown as striking the recording layer first and then the substrate; it will be understood that the following detailed description applies equally well to embodiments in which the incident light strikes the substrate first. Furthermore, it should be understood that in practice a focused beam would generally be used.

As shown in FIG. 3, light 11 (from a laser 10) is incident on a surface $S_1$ of the recording layer 5 which forms a boundary between the layer 5 and a medium above the layer. If the index of refraction $N_L$ of the layer 5 is different from the index of refraction $N_O$ of the other medium a Fresnel reflection from the surface $S_1$ occurs; a portion of the incident light is also refracted by an angle $\theta$ according to Snell's law as it passes into the layer 5. As is usual with optical disk systems, the angle of incidence $\theta_i$ is zero so the refracted angle $\theta_r$ is also zero. The light portion 13 transmitted into layer 5 continues to another surface $S_2$ of the layer and a surface of the substrate supporting the layer. Again, if the index of refraction $N_L$ is different from the index of refraction $N_S$ of the substrate, Fresnel reflection occurs. A portion of light 15 Fresnel-reflected from surface $S_2$ passes back through the layer 5 and some of it is transmitted through the surface $S_1$. (A portion of this light, Fresnel-reflected by the surface $S_1$, is ignored.) This transmitted light interferes with the portion of the incident light 11 Fresnel-reflected by the surface $S_1$, forming reflected light 17.

In general, the intensity of the reflected light 17 is related to the intensity, polarization and angle of incidence of the incident light 11, the absorptivity and thickness t of the layer 5, and the indices of refraction $N_O$, $N_L$ and $N_S$. The Fresnel equations give an intensity reflectance R of the combination of the layer and substrate which relates the incidence light intensity to the reflected light intensity. In the limit of normal incidence, the reflectance R is given by:

$$R = \frac{r_{12}^2 + r_{23}^2 + 2 r_{12} r_{23} \cos\beta}{1 + r_{12}^2 r_{23}^2 + 2 r_{12} r_{23} \cos\beta} \quad (1)$$

where:

$$r_{12} = \frac{N_L - N_O}{N_L + N_O} \quad r_{23} = \frac{N_S - N_L}{N_S + N_L} \quad (2)$$

and: $\beta = 4\pi t N_L$ where $\lambda$ is the wavelength of the incident light 11.

When $N_L$ is greater than $N_S$, it can be seen from Equation 1 that the reflectance R is a maximum when the cosine term is negative unity. From Equation 2, reflectance maxima occur when:

$$t = \frac{\lambda(2n - 1)}{4 N_L} \quad (3)$$

where n is a positive integer. By selecting the thickness t of the layer 5, the reflectance of, and thus the intensity of the light reflected from, the disk can be adjusted to almost any desired value.

For example, when $N_O$ is 1.0, $N_L$ is 3 and $N_S$ is 1.5, and $\lambda$ is 830 nm, the first reflection maximum occurs at a layer thickness t = 69.2 nm, and subsequent maxima recur every 138 nm. The maximum value of the reflectance R is 0.79 while the minimum value is 0.04. The minimum reflectance value also recurs, according to Equation 1, with the first minimum occurring when the layer thickness t is zero.

It is similarly possible to vary the reflectance of the disk by varying the index of refraction $N_L$ of the layer 5 without changing its thickness t, or by a combination of a change in index and a change in thickness. These two parameters of the layer 5 can be expressed by a single factor called the optical thickness of the layer 5 which is the physical thickness t multiplied by the refractive index $N_L$. It can be seen from Equation 3 that when the optical thickness of the layer 5 is an odd-integer multiple of a quarter of the wavelength of the light 11 the intensity of the light reflected from the disk is maximal.

Ignoring the effects of absorption in the layer 5 and the substrate 3, the transmitted intensity is merely the difference between the incident and the reflected intensities. Since the intensity of the light transmitted by the disk is inversely proportional to the intensity of the light reflected, Equation 3 also expresses the condition for the minimal transmitted intensity. The maximal transmitted intensity recurs, according to Equation 1, with the first maximum occurring when the layer thickness t is zero.

By selecting the optical thickness of the layer 5, the intensity of the light reflected or transmitted by the disk is modified in a known manner. Different values of reflectance R can be detected by measuring the different intensities of light reflected from the disk. These different intensities can then be assigned arbitrarily to the elements of a digital coding system. For example, the maximum reflected intensity can be assigned the element ONE and the minimum reflected intensity can be assigned the element ZERO of a binary system. For increased data storage capacity, other coding systems can be used; for example a ternary or three-level system could have the ZERO element assigned to the maximum reflected intensity, the ONE element assigned to the median intensity and the TWO element assigned to the minimal intensity. Higher level coding systems may also be realized by more finely dividing the range of reflected intensity.

The optical thickness of the layer 5 is preferably selected by the influence of a high-intensity illumination of the layer. The disk is initially fabricated with a layer 5 having a first thickness value. The first value may be selected arbitrarily within the range of minimal and maximal reflectance. Depending on the absorptivity of the layer 5, a suitably high-intensity illumination for a suitable period of time of the layer 5 can deposit enough energy into the layer to change by a known amount either the physical thickness of the layer or the index of refraction of the layer or both. A variety of known materials such as certain organic dyes can be used advantageously for the layer 5.

The high-intensity illumination which is used to write data onto the disk can be provided by the same laser 10 used to read the data on the disk. If the wavelength of the light emitted by the laser 10 is kept constant, the intensity of the light used to read the data must be less than the intensity used to write the data. This restriction may be unnecessary for read/and write-illuminations of differing wavelengths.

In addition to allowing the encoding of data by a multiple-level, i.e. more than two, digital system, a disk according to the present invention may store data encoded in a binary system using, for example, the minimal reflected intensity level as the ZERO element and an intensity level equal to the minimal intensity plus one-third of the range between the minimal and maximal intensities as the ONE element. Address information which can be used to locate particular groups of data can then be encoded by a binary system in which, for example, the maximal reflected intensity level is the ZERO element and an intensity level equal to the maximal intensity less one-third of the range between the minimal and maximal intensities is the ONE element. Such a disk can provide increased speed of access to desired data with fewer location errors.

In another embodiment in accordance with the present invention, data and address information encoded in a binary system using two different levels of reflected intensity can be recorded on tracks which alternate with other tracks containing data and address information encoded in a binary system using two other levels of reflected intensity, distinct from the first two levels. The tracks can thus be positioned more closely together, allowing more tracks and thus more data to be stored on a disk of a given size.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An optical disk for storing and retrieving information encoded according to a digital system based on light intensity modified by the disk, comprising:
   a substrate which has a first index of refraction at a predetermined wavelength; and
   a layer, disposed on the substrate, which has a second index of refraction at the predetermined wavelength different from the first index and which has a first value of optical thickness, wherein the first value is different from one-quarter of the predetermined wavelength multiplied by an odd positive integer, and wherein the optical thickness of the layer is selectively changeable to one of two distinct values different from the first value, and one of the two distinct values is substantially equal to one-quarter of the predetermined wavelength multiplied by an odd positive integer.

2. The optical disk of claim 1, wherein the selective change in the optical thickness is in response to an intensity level of illumination of the layer by light of the predetermined wavelength, and wherein the layer is an organic dye.

3. The optical disk of claim 2, wherein the predetermined wavelength is 830 nanometers.

4. An optical disk for storing and retrieving information encoded according to a tri-level digital system based on light intensity reflected by the disk, comprising:
   a substrate which has a first index of refraction at a predetermined wavelength; and
   an organic dye layer, disposed on a substrate, which has a second index of refraction at the predetermined wavelength different from the first index and which has first value of optical thickness, wherein the optical thickness of the dye layer is selectively changeable to one of two distinct values different from the first value.

5. The optical disk of claim 4, wherein the first value is different from one-quarter of the predetermined wavelength multiplied by an odd positive integer, and one of the two distinct values is substantially equal to one-quarter of the predetermined wavelength multiplied by an odd positive integer.

6. The optical disk of claim 4, wherein the optical thickness of the dye layer is changeable in response to absorption by the dye of light of the predetermined wavelength.

7. The optical disk of claim 4, wherein the predetermined wavelength is 830 nanometers and the substrate is substantially transparent at the wavelength.

8. A process for storing and retrieving data encoded according to a digital system based on light intensity modified by an optical disk having a substrate with a first index of refraction at a predetermined wavelength and a layer, disposed on the substrate, with a second index of fraction at the predetermined wavelength, comprising the steps of:

illuminating the layer with an intensity for changing an optical thickness value of the layer, wherein the intensity is selected to change the value to one of two distinct values;

illuminating the disk with light of the predetermined wavelength and a low intensity; and sensing a modification of the low intensity light of the predetermined wavelength illuminating the disk, wherein the optical thickness value of the layer is changed to one-quarter of the predetermined wavelength multiplied by an odd positive integer.

9. The process of claim 8, wherein the layer is illuminated by light of the predetermined wavelength for changing the optical thickness of the layer and the thickness of the layer changes in response to absorption of the light, wherein the low intensity does not change the optical thickness value of the layer, and wherein the layer is an organic dye, and the substrate is substantially transparent at the predetermined wavelength.

* * * * *